(12) United States Patent
Van Hove et al.

(10) Patent No.: US 11,834,226 B2
(45) Date of Patent: *Dec. 5, 2023

(54) INTEGRALLY BLOW-MOULDED BAG-IN-CONTAINER HAVING INTERFACE VENTS OPENING TO THE ATMOSPHERE AT LOCATION ADJACENT TO BAG'S MOUTH; PREFORM FOR MAKING IT; AND PROCESSES FOR PRODUCING THE PREFORM AND BAG-IN-CONTAINER

(71) Applicant: ANHEUSER-BUSCH INBEV S.A., Brussels (BE)

(72) Inventors: Sarah Van Hove, Korbeek-Dijle (BE); Daniel Peirsman, Bornem (BE); Rudi Verpoorten, Steinhausen (CH)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,321

(22) Filed: Jun. 23, 2022

(65) Prior Publication Data
US 2022/0315287 A1    Oct. 6, 2022

Related U.S. Application Data

(60) Continuation of application No. 16/944,728, filed on Jul. 31, 2020, now abandoned, which is a
(Continued)

(51) Int. Cl.
*B65D 25/16* (2006.01)
*B29C 45/16* (2006.01)
(Continued)

(52) U.S. Cl.
CPC .......... *B65D 25/16* (2013.01); *B29C 45/1684* (2013.01); *B29C 49/071* (2022.05);
(Continued)

(58) Field of Classification Search
CPC ... B29C 49/22; B29C 45/1684; B29C 49/071; B29C 49/06; B29C 2949/3016;
(Continued)

(56) References Cited

U.S. PATENT DOCUMENTS 2,959,812 A    11/1960    Allen
3,050,773 A    8/1962    Hagen
(Continued)

FOREIGN PATENT DOCUMENTS

CN    102317051 A    1/2012
DE    2115269 A1    10/1972
(Continued)

OTHER PUBLICATIONS

Avery, Jack, "Gas-Assist Injection Molding," chapter 1, pp. 1-29, Hanser-Gardner Publications, 2001.
(Continued)

*Primary Examiner* — Monica A Huson
(74) *Attorney, Agent, or Firm* — Klintworth & Rozenblat IP LLP (57) ABSTRACT

The invention is an integrally blow-moulded bag-in-container and preform and a method for making it. The bag-in-container has an inner layer forming the bag and an outer layer forming the container, and a mouth fluidly connecting the volume defined by the bag to the atmosphere. The container further has at least one interface vent fluidly connecting the interface between inner and outer layers to the atmosphere, wherein the at least one vent runs parallel to the interface between inner and outer layers and opens to the atmosphere at a location adjacent to, and oriented coaxially with the bag-in-container's mouth. Processes for manufacturing a preform and a bag-in-container as defined above are defined too.

5 Claims, 2 Drawing Sheets

Related U.S. Application Data continuation of application No. 15/919,159, filed on Mar. 12, 2018, now Pat. No. 10,730,664, which is a continuation of application No. 14/552,419, filed on Nov. 24, 2014, now Pat. No. 9,919,841, which is a division of application No. 12/450,896, filed as application No. PCT/EP2008/054765 on Apr. 18, 2008, now Pat. No. 8,931,651, which is a continuation-in-part of application No. 11/785,747, filed on Apr. 19, 2007, now abandoned.

(51) Int. Cl.
*B65D 23/02* (2006.01)
*B65D 83/00* (2006.01)
*B29C 49/00* (2006.01)
*B29C 49/22* (2006.01)
*B65D 33/01* (2006.01)
*B29K 101/12* (2006.01)
*B29L 31/00* (2006.01)
*B29L 9/00* (2006.01)
*B29C 49/06* (2006.01)
*B29K 105/00* (2006.01)

(52) U.S. Cl.
CPC .............. *B29C 49/22* (2013.01); *B65D 23/02* (2013.01); *B65D 33/01* (2013.01); *B65D 83/0055* (2013.01); *B29C 49/06* (2013.01); *B29C 2049/222* (2013.01); *B29C 2949/08* (2022.05); *B29C 2949/302* (2022.05); *B29C 2949/3008* (2022.05); *B29C 2949/3012* (2022.05); *B29C 2949/3016* (2022.05); *B29C 2949/3032* (2022.05); *B29K 2101/12* (2013.01); *B29K 2105/258* (2013.01); *B29L 2009/00* (2013.01); *B29L 2009/001* (2013.01); *B29L 2031/712* (2013.01); *B29L 2031/7158* (2013.01); *Y02W 90/10* (2015.05)

(58) Field of Classification Search
CPC .... B29C 2949/3094; B29C 2949/3032; B29C 2949/0715; B29C 2949/302; B29C 2949/3012; B29C 2949/08; B29C 2949/3008; B29C 2049/222; B65D 23/02; B65D 83/0055; B65D 33/01; B65D 25/16; B29L 2009/00; B29L 2031/7158; B29L 2031/712; B29L 2009/001; B29K 2101/12; B29K 2105/258; Y02W 90/10
See application file for complete search history.

(56) References Cited

U.S. PATENT DOCUMENTS

| | | |
|---|---|---|
| 3,285,461 A | 11/1966 | Santelli |
| 3,450,254 A | 6/1969 | Miles |
| 3,484,011 A | 12/1969 | Greenhalgh et al. |
| 3,491,918 A | 1/1970 | Lucas |
| 3,632,004 A | 1/1972 | Grimes et al. |
| 3,843,005 A | 10/1974 | Uhlig |
| 3,869,056 A | 3/1975 | Valyi |
| 3,878,282 A | 4/1975 | Bonis et al. |
| 3,932,104 A | 1/1976 | Schneider |
| 3,940,001 A | 2/1976 | Haefner et al. |
| 3,955,697 A | 5/1976 | Valyi |
| 4,013,748 A | 3/1977 | Valyi |
| 4,079,850 A | 3/1978 | Suzuki et al. |
| 4,092,391 A | 5/1978 | Valyi |
| 4,107,362 A | 8/1978 | Valyi |
| 4,147,278 A | 4/1979 | Uhlig |
| 4,170,623 A | 10/1979 | Dubois et al. |
| 4,233,010 A | 11/1980 | Suzuki |
| 4,243,725 A | 1/1981 | Wiggins et al. |
| 4,250,078 A | 2/1981 | McFarlane |
| 4,273,246 A | 6/1981 | Thompson |
| 4,280,859 A | 7/1981 | Thompson |
| 4,330,066 A | 5/1982 | Berliner |
| 4,339,502 A | 7/1982 | Gerry et al. |
| 4,378,328 A | 3/1983 | Przytulla et al. |
| 4,381,277 A | 4/1983 | Nilsson |
| 4,408,004 A | 10/1983 | Pengilly |
| 4,417,753 A | 11/1983 | Bacehowski et al. |
| 4,454,945 A | 6/1984 | Jabarin et al. |
| 4,459,400 A | 7/1984 | Kuhfuss et al. |
| 4,476,272 A | 10/1984 | Pengilly |
| 4,510,115 A | 4/1985 | Gokcen et al. |
| 4,529,570 A | 7/1985 | Przytulla |
| 4,609,516 A | 9/1986 | Krishnakumar et al. |
| 4,646,925 A | 3/1987 | Nohara |
| 4,680,208 A | 7/1987 | Aoki et al. |
| 4,696,840 A | 9/1987 | McCullough et al. |
| 4,816,093 A | 3/1989 | Robbins, III |
| 4,818,575 A | 4/1989 | Hirata et al. |
| 4,847,129 A | 7/1989 | Collette et al. |
| 4,863,665 A | 9/1989 | Schad et al. |
| 4,865,224 A | 9/1989 | Streck |
| 4,865,234 A | 9/1989 | Folgero |
| 4,875,508 A | 10/1989 | Burke, II et al. |
| 4,892,230 A | 1/1990 | Lynn, Jr. |
| 4,933,135 A | 6/1990 | Horwege et al. |
| 4,984,713 A | 1/1991 | Chambers et al. |
| 5,012,944 A | 5/1991 | Scheurenbrand et al. |
| 5,012,956 A | 5/1991 | Stoody |
| 5,069,363 A | 12/1991 | Daimler |
| 5,197,602 A | 3/1993 | Biesecker et al. |
| 5,219,005 A | 6/1993 | Stoffel |
| 5,242,085 A | 9/1993 | Richter et al. |
| 5,301,838 A | 4/1994 | Schmidt et al. |
| 5,332,121 A | 7/1994 | Schmidt et al. |
| 5,344,045 A | 9/1994 | Richter et al. |
| 5,368,195 A | 11/1994 | Pleet et al. |
| 5,381,927 A | 1/1995 | Richter et al. |
| 5,407,629 A | 4/1995 | Schmidt et al. |
| 5,429,702 A | 7/1995 | Grooms et al. |
| 5,433,347 A | 7/1995 | Richter et al. |
| 5,435,452 A | 7/1995 | Nishigami et al. |
| 5,447,678 A | 9/1995 | Kneer et al. |
| 5,464,106 A | 11/1995 | Slat et al. |
| 5,472,753 A | 12/1995 | Farha |
| 5,508,076 A | 4/1996 | Bright |
| 5,513,761 A | 5/1996 | Kobayashi et al. |
| 5,529,744 A | 6/1996 | Tindale |
| 5,567,377 A | 10/1996 | Nishigami et al. |
| 5,582,788 A | 12/1996 | Collette et al. |
| 5,647,930 A | 7/1997 | Bright |
| 5,688,570 A | 11/1997 | Ruttinger, Sr. |
| 5,750,216 A | 5/1998 | Horino et al. |
| 5,780,128 A | 7/1998 | Farha |
| 5,799,809 A | 9/1998 | Sako et al. |
| 5,804,016 A | 9/1998 | Schmidt et al. |
| 5,804,305 A | 9/1998 | Slat et al. |
| 5,819,978 A | 10/1998 | Hlebovy |
| 5,894,041 A | 4/1999 | Cornell |
| 5,908,124 A | 6/1999 | Klauke et al. |
| 5,912,416 A | 6/1999 | Weisker |
| 5,921,416 A | 7/1999 | Uehara |
| 5,921,438 A | 7/1999 | Kobayashi et al. |
| 5,925,710 A | 7/1999 | Wu et al. |
| 5,927,525 A | 7/1999 | Darr et al. |
| RE36,410 E | 11/1999 | Meshberg |
| 5,989,482 A | 11/1999 | Sagawa |
| 6,034,167 A | 3/2000 | Tung et al. |
| 6,039,204 A | 3/2000 | Hosokoshiyama et al. |
| 6,066,287 A | 5/2000 | Brady et al. |
| 6,068,900 A | 5/2000 | Kohn et al. |
| 6,083,450 A | 7/2000 | Safian |
| 6,136,286 A | 10/2000 | Okuyama et al. |
| 6,195,201 B1 | 2/2001 | Koch et al. |
| 6,197,851 B1 | 3/2001 | Maxwell et al. |
| 6,198,793 B1 | 3/2001 | Schultz et al. |
| 6,205,847 B1 | 3/2001 | Nomoto |
| 6,238,201 B1 | 5/2001 | Safian |

(56) References Cited

U.S. PATENT DOCUMENTS

| | | |
|---|---|---|
| 6,254,820 B1 | 7/2001 | Cornell |
| 6,266,943 B1 | 7/2001 | Nomoto et al. |
| 6,276,558 B1 | 8/2001 | Kneer |
| 6,312,641 B1 | 11/2001 | Hutchinson |
| 6,332,726 B2 | 12/2001 | Yamamoto et al. |
| 6,352,426 B1 | 3/2002 | Hutchinson et al. |
| 6,359,969 B1 | 3/2002 | Shmaenok |
| H2018 H | 4/2002 | Giaimo et al. |
| 6,438,199 B1 | 8/2002 | Schultz et al. |
| 6,467,653 B1 | 10/2002 | Hamamoto et al. |
| 6,499,311 B2 | 12/2002 | Mahajan |
| 6,503,440 B2 | 1/2003 | Kuehn et al. |
| 6,503,586 B1 | 1/2003 | Wu et al. |
| 6,516,839 B1 | 2/2003 | Timp et al. |
| 6,521,159 B1 | 2/2003 | Rashid et al. |
| 6,570,168 B1 | 5/2003 | Schultz et al. |
| 6,581,803 B1 | 6/2003 | Yoshimoto et al. |
| 6,602,568 B2 | 8/2003 | Semersky |
| 6,641,881 B1 | 11/2003 | Darr |
| 6,645,421 B1 | 11/2003 | Sanderson et al. |
| 6,649,121 B1 | 11/2003 | Hamamoto et al. |
| 6,670,007 B1 | 12/2003 | Safian et al. |
| 6,676,883 B2 | 1/2004 | Hutchinson et al. |
| 6,722,102 B1 | 4/2004 | Pape et al. |
| 6,749,785 B2 | 6/2004 | Subramanian et al. |
| 6,933,055 B2 | 8/2005 | Share et al. |
| 6,981,617 B2 | 1/2006 | Nakamura et al. |
| 7,036,690 B2 | 5/2006 | Tsubaki et al. |
| 7,044,334 B2 | 5/2006 | Mita et al. |
| 7,055,719 B2 | 6/2006 | Nomoto et al. |
| 7,114,636 B2 | 10/2006 | Yoshimoto et al. |
| 7,188,751 B2 | 3/2007 | Van Der Klaauw et al. |
| 7,201,291 B2 | 4/2007 | Vigny et al. |
| 7,204,950 B2 | 4/2007 | Farha et al. |
| 7,253,422 B2 | 8/2007 | Smith |
| 7,277,158 B2 | 10/2007 | Dierichs |
| 7,303,387 B2 | 12/2007 | Hutchinson et al. |
| 7,459,119 B2 | 12/2008 | Ota et al. |
| 7,482,047 B1 | 1/2009 | Tremley et al. |
| 7,614,515 B2 | 11/2009 | Furusawa et al. |
| 7,816,436 B2 | 10/2010 | Harrison et al. |
| 7,837,927 B2 | 11/2010 | Morel et al. |
| 8,029,718 B2 | 10/2011 | O'Brien et al. |
| 8,118,183 B2 | 2/2012 | Iwahashi et al. |
| 9,555,572 B2 | 1/2017 | Van Hove et al. |
| 9,919,841 B2 | 3/2018 | Van Hove et al. |
| 10,668,659 B2 | 6/2020 | Van Hove et al. |
| 10,730,664 B2 | 8/2020 | Van Hove et al. |
| 10,864,671 B2 | 12/2020 | Van Hove et al. |
| 2001/0040173 A1 | 11/2001 | Yamamoto et al. |
| 2002/0022140 A1 | 2/2002 | Semersky |
| 2002/0130139 A1 | 9/2002 | Shiraishi et al. |
| 2002/0141071 A1 | 10/2002 | Singer et al. |
| 2002/0153386 A1 | 10/2002 | Uetake et al. |
| 2002/0190079 A1 | 12/2002 | Hamamoto |
| 2003/0031017 A1 | 2/2003 | Tsuji |
| 2003/0086524 A1 | 5/2003 | Schultz et al. |
| 2003/0095623 A1 | 5/2003 | Singer et al. |
| 2004/0060889 A1 | 4/2004 | Yoneyama et al. |
| 2004/0061930 A1 | 4/2004 | Wedowski |
| 2004/0069735 A1 | 4/2004 | Yoneyama et al. |
| 2004/0076782 A1 | 4/2004 | Safian et al. |
| 2004/0086703 A1 | 5/2004 | Semersky |
| 2004/0112921 A1 | 6/2004 | Nomoto et al. |
| 2004/0119961 A1 | 6/2004 | Singer et al. |
| 2004/0151937 A1 | 8/2004 | Hutchinson et al. |
| 2004/0159983 A1 | 8/2004 | Clougherty |
| 2004/0187444 A1 | 9/2004 | Hutchinson et al. |
| 2004/0217128 A1 | 11/2004 | Nakamura et al. |
| 2004/0227922 A1 | 11/2004 | Dierichs et al. |
| 2004/0239908 A1 | 12/2004 | Bleeker et al. |
| 2004/0257546 A1 | 12/2004 | Banine |
| 2005/0029337 A1 | 2/2005 | Van Handel |
| 2005/0103802 A1 | 5/2005 | Alberg |
| 2005/0115054 A1 | 6/2005 | Brandner et al. |
| 2005/0133578 A1 | 6/2005 | Farha et al. |
| 2005/0136201 A1 | 6/2005 | Farha et al. |
| 2005/0270513 A1 | 12/2005 | Dierichs et al. |
| 2005/0275818 A1 | 12/2005 | Singer |
| 2006/0006586 A1 | 1/2006 | Farha et al. |
| 2006/0054635 A1 | 3/2006 | Iwahashi et al. |
| 2006/0065992 A1 | 3/2006 | Hutchinson et al. |
| 2006/0073294 A1 | 4/2006 | Hutchinson et al. |
| 2006/0078089 A1 | 4/2006 | Masaki et al. |
| 2006/0091328 A1 | 5/2006 | Kanazawa |
| 2006/0119824 A1 | 6/2006 | Dierichs |
| 2006/0132747 A1 | 6/2006 | Singer et al. |
| 2006/0138354 A1 | 6/2006 | Bakker et al. |
| 2006/0141189 A1 | 6/2006 | Akiyama et al. |
| 2006/0160031 A1 | 7/2006 | Wurm et al. |
| 2006/0257603 A1 | 11/2006 | Shi et al. |
| 2007/0262092 A1 | 11/2007 | Tyski |
| 2007/0273853 A1 | 11/2007 | Bleeker et al. |
| 2008/0100816 A1 | 5/2008 | Mulder et al. |
| 2008/0272154 A1 | 6/2008 | Maas et al. |
| 2008/0257846 A1 | 10/2008 | Hove et al. |
| 2008/0257847 A1 | 10/2008 | Van Hove et al. |
| 2008/0258353 A1 | 10/2008 | Hutchinson et al. |
| 2008/0258356 A1 | 10/2008 | Van Hove et al. |
| 2008/0260978 A1 | 10/2008 | Van Hove et al. |
| 2009/0057347 A1 | 3/2009 | Leys et al. |
| 2009/0206524 A1 | 8/2009 | Laidler et al. |
| 2010/0239799 A1 | 9/2010 | Van Hove et al. |
| 2010/0243596 A1 | 9/2010 | Van Hove et al. |
| 2010/0252583 A1 | 10/2010 | Maas et al. |
| 2011/0149200 A1 | 6/2011 | Joo |
| 2012/0132607 A1 | 5/2012 | Landman et al. |
| 2015/0210420 A1 | 7/2015 | Hosokoshiyama |

FOREIGN PATENT DOCUMENTS

| | | |
|---|---|---|
| DE | 69632354 T2 | 5/2005 |
| EP | 0118042 A1 | 9/1984 |
| EP | 0189750 A2 | 8/1986 |
| EP | 0161185 A3 | 11/1987 |
| EP | 189750 A3 | 3/1989 |
| EP | 0389191 A1 | 9/1990 |
| EP | 0346518 B1 | 2/1993 |
| EP | 0729819 A1 | 11/1996 |
| EP | 0759399 A1 | 2/1997 |
| EP | 0799683 A2 | 10/1997 |
| EP | 1048436 A1 | 11/2000 |
| EP | 0759399 B1 | 1/2002 |
| EP | 1167223 A1 | 1/2002 |
| EP | 1180424 A1 | 2/2002 |
| EP | 1048436 A4 | 3/2002 |
| EP | 1245499 A1 | 10/2002 |
| EP | 1356915 A1 | 10/2003 |
| EP | 1180424 B1 | 4/2004 |
| EP | 1547768 A1 | 6/2005 |
| EP | 1593605 A1 | 11/2005 |
| EP | 1167223 B1 | 12/2005 |
| EP | 1671776 A1 | 6/2006 |
| EP | 1482366 A2 | 10/2007 |
| EP | 1245499 B1 | 4/2009 |
| EP | 1593605 B1 | 10/2009 |
| EP | 2245954 A1 | 11/2010 |
| EP | 1356915 B1 | 11/2011 |
| EP | 1284918 A1 | 6/2012 |
| EP | 2148770 B2 | 11/2021 |
| FR | 2138685 B1 | 7/1973 |
| FR | 2676958 A1 | 12/1992 |
| FR | 2717783 A1 | 9/1995 |
| FR | 2866010 A1 | 8/2005 |
| GB | 1329257 A | 9/1973 |
| JP | S4826027 A | 4/1973 |
| JP | S57174221 A | 10/1982 |
| JP | S60201909 A | 10/1985 |
| JP | S61185417 A | 8/1986 |
| JP | H02108516 A | 4/1990 |
| JP | H04173134 A | 6/1992 |
| JP | H04267727 A | 9/1992 |
| JP | H0531791 A | 2/1993 |
| JP | H05213373 A | 8/1993 |

(56) References Cited

FOREIGN PATENT DOCUMENTS

| | | |
|---|---|---|
| JP | H0639906 A | 2/1994 |
| JP | H06345069 A | 12/1994 |
| JP | H071564 A | 1/1995 |
| JP | H0748519 A | 2/1995 |
| JP | H0748519 A | 11/1995 |
| JP | H081761 A | 1/1996 |
| JP | H08175568 A | 7/1996 |
| JP | H09150830 A | 6/1997 |
| JP | 09208688 A | 8/1997 |
| JP | H09208688 A | 8/1997 |
| JP | H09308688 A | 12/1997 |
| JP | H1010719 A | 1/1998 |
| JP | H10500078 A | 1/1998 |
| JP | H10128833 A | 5/1998 |
| JP | H10180853 A | 7/1998 |
| JP | H10338269 A | 12/1998 |
| JP | H1110719 A | 1/1999 |
| JP | H1177744 A | 3/1999 |
| JP | 2000016469 A | 1/2000 |
| JP | 2000-62745 | 2/2000 |
| JP | 2000062745 A | 2/2000 |
| JP | 2001001389 A | 1/2001 |
| JP | 2001106218 A | 4/2001 |
| JP | 2001179810 A | 7/2001 |
| JP | 2002198309 A | 7/2002 |
| JP | 2002313598 A | 10/2002 |
| JP | 2004128449 A | 4/2004 |
| JP | 2004149196 A | 5/2004 |
| JP | 3556344 B2 | 8/2004 |
| JP | 2005047172 A | 2/2005 |
| JP | 2005047538 A | 2/2005 |
| JP | 2005075414 A | 3/2005 |
| JP | 2006036250 A | 2/2006 |
| JP | 2006165552 A | 6/2006 |
| JP | 2006182389 A | 7/2006 |
| JP | 3935213 B2 | 6/2007 |
| JP | 2007276790 A | 10/2007 |
| JP | 2008254774 A | 10/2008 |
| JP | 4580524 B2 | 11/2010 |
| JP | 4586223 B2 | 11/2010 |
| JP | WO2011/010719 A1 | 1/2013 |
| KR | 20070012493 A | 1/2007 |
| KR | 20070119060 A | 12/2007 |
| KR | 100859229 B1 | 9/2008 |
| KR | 100921267 B1 | 10/2009 |
| RU | 2133699 C1 | 7/1999 |
| RU | 2346871 C2 | 2/2009 |
| UA | 82470 C2 | 4/2008 |
| WO | WO1990007414 A1 | 7/1990 |
| WO | WO1990007555 A1 | 7/1990 |
| WO | WO19990003668 A1 | 1/1991 |
| WO | WO 91/08099 A1 | 6/1991 |
| WO | WO19910008099 A1 | 6/1991 |
| WO | WO 9112926 A1 | 9/1991 |
| WO | WO19910012926 A1 | 9/1991 |
| WO | WO 92/11187 A1 | 7/1992 |
| WO | WO19920011187 A1 | 7/1992 |
| WO | WO19980013292 A1 | 4/1998 |
| WO | WO1999003668 A1 | 1/1999 |
| WO | WO19990011561 A1 | 3/1999 |
| WO | WO1999033634 A1 | 7/1999 |
| WO | WO2000003944 A1 | 1/2000 |
| WO | WO0185420 A1 | 11/2001 |
| WO | WO20030037725 A1 | 5/2003 |
| WO | WO2004060748 A1 | 7/2004 |
| WO | WO2004106426 A1 | 7/2005 |
| WO | WO2006124199 A1 | 11/2006 |
| WO | WO 2007/039158 A1 | 4/2007 |
| WO | WO2007039158 A1 | 4/2007 |
| WO | WO2006107099 A1 | 10/2008 |
| WO | WO2008129016 A1 | 10/2008 |
| WO | WO2009041809 A1 | 4/2009 |
| WO | WO2009088285 A1 | 7/2009 |
| WO | WO2009154446 A1 | 12/2009 |
| WO | WO2009074285 A1 | 3/2010 |
| WO | WO2010044659 A1 | 4/2010 |
| WO | WO2010014004 A3 | 11/2010 |
| WO | WO 2014/077681 A2 | 5/2014 |
| WO | WO2014077681 A3 | 8/2014 |

OTHER PUBLICATIONS

Berger Kenneth R., reviewed by B. Welt, A Brief History of Packaging, (ABE321) Agricultural and Biological = Engineering Department, Florida Cooperative Extension Service, Institute of Food and Agricultural Sciences, University of Florida. Original publication, Dec. 2002, Reviewed Dec. 2005, http://edis.ifas.ufl.edu, 5 pages. Heineken Ex. 1016.

Charles A. Harper, Handbook of Plastic Processes, 2006, 90 pages, Hoboken, New Jersey, John Wiley & Sons, Inc. Publication. Heiniken Ex. 1028.

Leaversuch, R.,"Barrier PET Bottles," Plastics Technology, Mar. 2003, web: http://www.ptonline.com/articles/barrier-pet-bottles.

Ex Parte Quayle Action dated Sep. 9, 2014 for U.S. Appl. No. 12/450,896, now Patented.

Injection Molding, Blow Molding, Encyclopedia of Polymer Science and Technology, 75 pages, vols. 1 and 3, Copyright John Wiley & Sons, Inc. Anheuser-Busch InBev Exhibit 2010.

In the High Court of Justice Business and Property Courts of England and Wales Intellectual Property List (ChD) Patents Court, Ground of Invalidity (EP 770), Oct. 9, 2018, 6 pages.

Clariant, Masterbatches for Thermoplastic Polyester, accessed Nov. 7, 2019. Heineken Ex. 1041. Date of Publication Currently Unknown According to Heineken Prior Art Notice (ITC 337-TA-1115).

Standard PET preforms & specific developments, PET preforms, 2016, 5 pages, www.pdg-plastiques.com. Heiniken Ex. 1031. Date of Publication Currently Unknown According to Heiniken Prior Art Notice (ITC 337-TA-1115).

Online article, "Co-molding—Overmolding—Plastopia," https://www.plastopialtd.com/co-molding/, Plastopia Molding Limited 2015-2021.

Online article, "Injection Overmolding—Plastopia," https://www.plastopialtd.com/overmolding/, Plastopia Molding Limited 2015-2021.

Bag-in-a-box (BiB)—Diffpack, Aug. 27, 2018, 7 pages, http://www_diffpack.com/bag-box-bb/. Heineken Ex_ 1020_ Date of Publication Currently Unknown According to Heineken Prior Art Notice (ITC 337-TA-1115).

Wiley, John & Sons, "Processing and finishing of Polymeric Materials," vol. 2, p. 221 (2011) ISBN 978-0-470-88917-6.

Non-Final Rejection dated Jan. 29, 2010 for U.S. Appl. No. 11/785,746, now Abandoned.

Non-Final Rejection dated Jan. 29, 2016 for U.S. Appl. No. 14/552,408, now Patented.

Non-Final Rejection dated Jul. 1, 2020 for U.S. Appl. No. 15/954,556, now Abandoned.

Non-Final Rejection dated Jul. 20, 2016 for U.S. Appl. No. 12/450,895, now Patented.

Non-Final Rejection dated Mar. 4, 2019 for U.S. Appl. No. 15/419,098, now Patented.

Non-Final Rejection dated Mar. 26, 2014 for U.S. Appl. No. 12/450,893, now Patented.

Non-Final Rejection dated Mar. 7, 2016 for U.S. Appl. No. 14/552,313, now Abandoned.

Non-Final Rejection dated Mar. 14, 2016 for U.S. Appl. No. 12/450,893, now Patented.

Non-Final Rejection dated Mar. 24, 2014 for U.S. Appl. No. 12/450,895, now Patented.

Non-Final Rejection dated May 27, 2009 for U.S. Appl. No. 11/785,745, now Abandoned.

Non-Final Rejection dated Nov. 28, 2012 for U.S. Appl. No. 12/450,893, now Patented.

Non-Final Rejection dated Oct. 1, 2021 for U.S. Appl. No. 16/944,728 Final Rejection Mailed.

Non-Final Rejection dated Oct. 3, 2019 for U.S. Appl. No. 15/853,597, now Patented.

(56) References Cited

OTHER PUBLICATIONS

Non-Final Rejection dated Oct. 9, 2012 for U.S. Appl. No. 12/450,895, now Patented.
Non-Final Rejection dated Oct. 10, 2012 for U.S. Appl. No. 12/450,892, now Patented.
Non-Final Rejection dated Oct. 11, 2012 for U.S. Appl. No. 12/450,904, now Patented.
Non-Final Rejection dated Sep. 6, 2011 for U.S. Appl. No. 11/785,745, now Abandoned.
Non-Final Rejection dated Sep. 18, 2015 for U.S. Appl. No. 14/552,365, now Abandoned.
Non-Final Rejection dated Sep. 19, 2012 for U.S. Appl. No. 12/450,896, now Patented.
Non-Final Rejection dated Sep. 22, 2015 for U.S. Appl. No. 14/552,408, now Patented.
Non-Final Rejection dated Sep. 25, 2013 for U.S. Appl. No. 12/450,892, now Patented.
Non-Final Rejection dated Sep. 27, 2016 for U.S. Appl. No. 12/450,895, now Patented.
Requirement for Restriction/Election dated Apr. 27, 2010 for U.S. Appl. No. 11/785,750, now Abandoned.
Requirement for Restriction/Election dated Aug. 7, 2012 for U.S. Appl. No. 12/450,892, now Patented.
Requirement for Restriction/Election dated Jun. 17, 2010 for U.S. Appl. No. 11/785,748, now Abandoned.
Requirement for Restriction/Election dated May 27, 2010 for U.S. Appl. No. 11/785,747, now Abandoned.
Requirement for Restriction/Election dated May 30, 2012 for U.S. Appl. No. 12/450,896, now Patented.
Restriction Requirement dated Feb. 18, 2020 for U.S. Appl. No. 15/954,556, now Abandoned.
Restriction Requirement dated Jan. 25, 2018 for U.S. Appl. No. 14/887,189, now Abandoned.
Restriction Requirement dated Oct. 5, 2012 for U.S. Appl. No. 12/450,893, now Patented.
Richard Coles, Derek Mcdowell, Mark J. Kirwan, Food Packaging Technology, 2003, 262 pages, Blackwell Publishing Ltd. Heineken Ex. 1017.
Wikipedia article, "Crystallization of polymers," last edited on May 18, 2018, retrieved from https://en.wikipedia.org/w/index.php?title=Crystalization_of_polymers&oldid=841776901.
Article, "Recycling," section 4.9, in "Plastics and the Environment," Anthony L. Andrady, ed., published by John Wiley & Sons, Inc., Hoboken, New Jersey, 2003, pp. 163-166.
Advisory Action dated Apr. 13, 2010 for U.S. Appl. No. 11/785,745, now Abandoned.
Advisory Action dated Aug. 20, 2013 for U.S. Appl. No. 12/450,896, now Patented.
Advisory Action dated Aug. 20, 2013 for U.S. Appl. No. 12/450,904, now Patented.
Advisory Action dated Dec. 1, 2014 for U.S. Appl. No. 12/450,892, now Patented.
Advisory Action dated Jul. 1, 2013 for U.S. Appl. No. 12/450,892, now Patented.
Advisory Action dated Jul. 28, 2021 for U.S. Appl. No. 15/954,556, now Abandoned.
Advisory Action dated Jun. 22, 2015 for U.S. Appl. No. 12/450,893, now Patented.
Advisory Action dated Sep. 16, 2015 for U.S. Appl. No. 12/450,895, now Patented.
Final Rejection dated May 14, 2015 for U.S. Appl. No. 12/450,892, now Patented.
Final Rejection dated Sep. 6, 2016 for U.S. Appl. No. 12/450,893, now Patented.
Final Rejection dated May 14, 2013 for U.S. Appl. No. 12/450,904, now Patented.
First Action Interview Office Action dated Jul. 12, 2016 for U.S. Appl. No. 15/051,610, now Patented.
Henk Albers declaration—Opposition of EP1.
Charles A. Harper, Handbook of Plastic Processes, 2006, 196 pages, Hoboken, New Jersey, John Wiley & Sons, Inc. Publication. Anheuser-Busch InBev Exhibit 2009.
Dutch speaking court of commerce judgement.
Ex Parte Quayle Action dated Sep. 9, 2014 for U.S. Appl. No. 12/450,904, now Patented.
Final Rejection dated May 13, 2013 for U.S. Appl. No. 12/450,896, now Patented.
Final Rejection dated Mar. 11, 2016 for U.S. Appl. No. 14/552,392, now Abandoned.
Final Rejection dated Mar. 11, 2013 for U.S. Appl. No. 12/450,895, now Patented.
Final Rejection dated Jun. 3, 2015 for U.S. Appl. No. 12/450,895, now Patented.
Final Rejection dated Jul. 26, 2013 for U.S. Appl. No. 12/450,893, now Patented.
Final Rejection dated Jul. 16, 2014 for U.S. Appl. No. 12/450,892, now Patented.
Final Rejection dated Apr. 1, 2020 for U.S. Appl. No. 15/853,597, now Patented.
Final Rejection dated Mar. 25, 2022 for U.S. Appl. No. 16/944,728 Final Rejection Mailed.
Final Rejection dated May 15, 2020 for U.S. Appl. No. 16/582,780, now Abandoned.
Final Rejection dated Oct. 20, 2021 for U.S. Appl. No. 16/440,744, now Abandoned.
Final Rejection dated Sep. 3, 2019 for U.S. Appl. No. 15/419,098, now Patented.
Final Rejection dated Apr. 11, 2017 for U.S. Appl. No. 12/450,895, now Patented.
Final Rejection dated Apr. 16, 2012 for U.S. Appl. No. 11/785,745, now Abandoned.
Final Rejection dated Apr. 21, 2015 for U.S. Appl. No. 12/450,893, now Patented.
Final Rejection dated Apr. 23, 2013 for U.S. Appl. No. 12/450,892, now Patented.
Final Rejection dated Dec. 4, 2009 for U.S. Appl. No. 11/785,745, now Abandoned.
Final Rejection dated Dec. 19, 2016 for U.S. Appl. No. 14/552,313, now Abandoned.
Final Rejection dated Feb. 2, 2021 for U.S. Appl. No. 15/954,556, now Abandoned.
Final Rejection dated Jan. 16, 2019 for U.S. Appl. No. 14/887,189, now Abandoned.
I Hwa Lee, Bonding "Unjoinable" Polymers, DuPont Packaging & Industrial Polymers, 2011, packaging.dupont.com, 7 pages. Heiniken Ex. 1029.
In the High Court of Justice Business and Property Courts of England and Wales Intellectual Property List (ChD) Patents Court, Particulars of Claim, Oct. 9, 2018, 2 pages.
International Search Report for International Application No. PCT/NL2008/050225 dated Sep. 22, 2008.
Japanese Office Action for Japanese Patent Application No. 2010-504004, dated Nov. 2, 2011.
John Bozzelli, What to Do About Weak Weld Lines: Plastics Technology, Apr. 1, 2008, 5 pages, https://www.ptonline.com/articles/what-to-do-about-weak-weld-lines. Heiniken Ex. 1030.
Misko, George G., The Regulation of Packaging by the Alcohol and Tobacco Tax and Trade Bureau: An Added Level of Complexity, Apr. 10, 2008, 6 pages, www.packaginglaw.com. Heiniken Ex. 1022.
Non-Final Rejection dated Jan. 26, 2017 for U.S. Appl. No. 14/552,343, now Patented.
Non-Final Rejection dated Apr. 13, 2021 for U.S. Appl. No. 16/440,744, now Abandoned.
Non-Final Rejection dated Apr. 4, 2018 for U.S. Appl. No. 14/887,189, now Abandoned.
Non-Final Rejection dated Apr. 5, 2016 for U.S. Appl. No. 14/552,365, now Abandoned.
Non-Final Rejection dated Apr. 7, 2017 for U.S. Appl. No. 14/552,426, now Patented.
Non-Final Rejection dated Aug. 7, 2019 for U.S. Appl. No. 15/919,159, now Patented.

(56) References Cited

OTHER PUBLICATIONS

Non-Final Rejection dated Aug. 30, 2021 for U.S. Appl. No. 16/889,566, now Abandoned.
Non-Final Rejection dated Aug. 6, 2013 for U.S. Appl. No. 12/450,895, now Patented.
Non-Final Rejection dated Dec. 19, 2019 for U.S. Appl. No. 16/582,780, now Abandoned.
Non-Final Rejection dated Dec. 22, 2021 for U.S. Appl. No. 17/115,721, now Abandoned.
Non-Final Rejection dated Dec. 2, 2013 for U.S. Appl. No. 12/450,896, now Patented.
Non-Final Rejection dated Feb. 12, 2015 for U.S. Appl. No. 12/450,893, now Patented.
Non-Final Rejection dated Feb. 3, 2010 for U.S. Appl. No. 11/785,749, now Abandoned.
Non-Final Rejection dated Feb. 4, 2014 for U.S. Appl. No. 12/450,904, now Patented.
Non-Final Rejection dated Jan. 13, 2015 for U.S. Appl. No. 12/450,892, now Patented.
Non-Final Rejection dated Jan. 25, 2017 for U.S. Appl. No. 14/552,419, now Patented.
Non-Final Rejection dated Jan. 26, 2015 for U.S. Appl. No. 12/450,895, now Patented.
Connor, M. et al., "A criterion for optimum adhesion applied to fibre reinforced composites," 32 Journal of Material Science 5059-67 (1997).
Dr. Ulrich K. Thiele, Polyester Bottle Resins, Production Processing, Properties and Recycling, 2007, 16 pages, Impressum, PETplanet print vol. 5. Heiniken Ex. 1035.
Giles, Geoff A., Handbook of Beverage Packaging, Sheffield Food Technology, 1999, 20 pages, Sheffield Academic Press Ltd. Heiniken Ex. 1019.\.
Multilayered blow molded container used for carbonated beverages, comprises resin made outer and inner layers, which are separable.
Norman Lee, Plastic Blow Molding Handbook, Society of Plastic Engineers and its Blow Molding Division, 1990, 18 pages, Van Nostrand Reinhold, New York, NY. Heiniken Ex. 1032.
Nyacol Nano Technologies, Inc., Transparent IR Absorbers and Antistatic Additives, Nyacol Applications, Aug. 27, 2018, 3 pages, http://www nyacol.com/application/it--absorbers-antistatic—additives/. Heiniken Ex. 1039. Date of Publication Currently Unknown According to Heiniken Prior Art Notice (ITC 337-TA-1115).
Omnexus by SpecialChem, The Universal Selection Source: Plastics & Elastomers, Thermoplastics Polyester PET, Aug. 23, 2018, 19 pages, https://omnexus.specialchem.com/selectors/c-thermoplastics-polyester-pet. Heiniken Ex. 1036. Date of Publication Currently Unknown According to Heiniken Prior Art Notice (ITC 337-TA-1115).
Sanchez-Valdes, S. et al., Polymer Engineering and Science, Jan. 1998, No. 1, 150-55.
Machine English translation of JP 10-180853.
Banine V. et al, "The relationship between an EUV source and the performance of an EUV lithographic system", Proceedings of SPIE, 20000101 IEEE, US, vol. 3997,pp. 126-135. XP002493691.
David W. Brooks and Geoff A. Giles, PET Packaging Technology, 2002, 390 pages, Scheffield Packaging Technology, Scheffield Academic Press Ltd. Heiniken Ex. 1018.
Du et al., Polymer Engineering and Science, 2010, 1111-21.
Dynamic mechanical analysis of PET, Thermal Analysis Application No. HB 238, Dec. 2009, 3 pages, Mettler-Toledo TA Application Handbook Thermoplastics. Heiniken Ex. 1037.
Fried, Joel R., Polymer Science & Technology (second edition), Prentice Hall Professional Technical Reference, 2003, 32 pages, Upper Saddle River, NJ 07458, www.phptr.com. Heiniken Ex. 1034.

INTEGRALLY BLOW-MOULDED BAG-IN-CONTAINER HAVING INTERFACE VENTS OPENING TO THE ATMOSPHERE AT LOCATION ADJACENT TO BAG'S MOUTH; PREFORM FOR MAKING IT; AND PROCESSES FOR PRODUCING THE PREFORM AND BAG-IN-CONTAINER

CROSS-REFERENCE TO RELATED APPLICATION

This application is a continuation application of, and claims priority to, U.S. patent application Ser. No. 16/944,728, filed Jul. 31, 2020 and incorporated herein by reference. U.S. patent application Ser. No. 16/944,728 is a continuation application of, and claims priority to, U.S. patent application Ser. No. 15/919,159, filed Mar. 12, 2018, now U.S. Pat. No. 10,730,664, and incorporated herein by reference. U.S. patent application Ser. No. 15/919,159 is a continuation application of, and claims priority to, U.S. patent application Ser. No. 14/552,419, filed Nov. 24, 2014, now U.S. Pat. No. 9,919,841, and incorporated herein by reference. U.S. patent application Ser. No. 14/552,419 is a divisional application of, and claims priority to, U.S. patent Ser. No. 12/450,896, filed May 24, 2010, now U.S. Pat. No. 8,931,651, and incorporated herein by reference. U.S. patent Ser. No. 12/450,896 is the National Stage of International Patent Application No. PCT/EP2008/054765, filed on Apr. 18, 2008, which is a continuation-in-part of U.S. patent application Ser. No. 11/785,747, filed on Apr. 19, 2007, now abandoned.

FIELD OF THE INVENTION

The present invention relates in general to new developments in dispensing bag-in-containers and, in particular, to the interface vents design which allows control of the pressure at the interface between an inner layer (the bag) and an outer layer (the container) of said bag-in-container, in order to separate the inner layer from the outer layer and collapse the inner bag. It also relates to a method for producing said bag-in-containers and, in particular, to preforms used for their production, as well as a method for producing said preform.

BACKGROUND OF THE INVENTION

Bag-in-containers, also referred to as bag-in-bottles or bag-in-boxes depending on the geometry of the outer vessel, all terms considered herein as being comprised within the meaning of the term bag-in-container, are a family of liquid dispensing packaging consisting of an outer container comprising an opening to the atmosphere—the mouth—and which contains a collapsible inner bag joined to said container and opening to the atmosphere at the region of said mouth. The system must comprise at least one vent fluidly connecting the atmosphere to the region between the inner bag and the outer container in order to control the pressure in said region to squeeze the inner bag and thus dispense the liquid contained therein.

Traditionally, bag-in-containers were—and still are—produced by independently producing an inner bag provided with a specific neck closure assembly and a structural container (usually in the form of a bottle). The bag is inserted into the fully formed bottle opening and fixed thereto by means of the neck closure assembly, which comprises one opening to the interior of the bag and vents fluidly connecting the space between bag and bottle to the atmosphere; examples of such constructions can be found inter alia in U.S. Pat. Nos. 3,484,011, 3,450,254, 4,330,066, and 4,892,230. These types of bag-in-containers have the advantage of being reusable, but they are very expensive and labour-intensive to produce.

More recent developments focused on the production of "integrally blow-moulded bag-in-containers" thus avoiding the labour-intensive step of assembling the bag into the container, by blow-moulding a polymeric multilayer preform into a container comprising an inner layer and an outer layer, such that the adhesion between the inner and the outer layers of the thus produced container is sufficiently weak to readily delaminate upon introduction of a gas at the interface. The "inner layer" and "outer layer" may each consist of a single layer or a plurality of layers, but can in any case readily be identified, at least upon delamination. Said technology involves many challenges and many alternative solutions were proposed.

The multilayer preform may be extruded or injection moulded (cf. U.S. Pat. No. 6,238,201, JPA10128833, JPA11010719, JPA9208688, U.S. Pat. No. 6,649,121). When the former method is advantageous in terms of productivity, the latter is preferable when wall thickness accuracy is required, typically in containers for dispensing beverage.

Preforms for the production of integrally blow-moulded bag-in-containers clearly differ from preforms for the production of blow-moulded co-layered containers, wherein the various layers of the container are not meant to delaminate, in the thickness of the layers. A bag-in-container is comprised of an outer structural envelope containing a flexible, collapsible bag. It follows that the outer layer of the container is substantially thicker than the inner bag. This same relationship can of course be found in the preform as well, which are characterized by an inner layer being substantially thinner than the outer layer. Moreover, in some cases, the preform already comprised vents which are never present in preforms for the production of co-layered containers (cf. EPA1356915).

One redundant problem with integrally blow-moulded bag-in-containers is the formation of the interface vents. Several solutions were proposed wherein the vent was formed after the bag-in-container was blow-moulded, as in U.S. Pat. Nos. 5,301,838, 5,407,629, JPA5213373, JPA8001761. This approach has of course the disadvantages that it involves an additional production step, and the danger of piercing the bag. Indeed these solutions have in common the formation of a hole normal to the outer container's wall and great accuracy is required not to degrade the inner layer's wall.

In EPA1356915 and U.S. Pat. No. 6,649,121, the preform is formed by injection moulding the outer layer first, followed by injection moulding the inner layer over the outer layer. During injection moulding of the layers, ventilation holes normal to the outer layer's wall are formed with protruding pins, which are flush with the inner surface of the thus obtained outer layer. The over-injected inner layer is not affected by the pins and this method solves the problem associated with the risk of damaging the inner bag during vents formation. The ventilation holes must be positioned close to the region of the container's mouth in an area of no or little stretching during the blow-moulding operation.

The venting holes described in EPA1356915 and U.S. Pat. No. 6,649,121, however, are not suitable for being connected to a source of pressurized gas to force delamination and squeezing of the inner bag. Furthermore, the inner and outer layers are little or not stretched in the region close to the container's mouth resulting in thicker and more rigid walls in this region than in the container's body. Consequently, a higher pressure would be required to delaminate the inner from the outer layers by blowing compressed air through the vents in a direction normal to the interface, as required in beg-in-containers for dispensing beverage like beer and sodas.

JPA10180853 discloses an integrally blow-moulded bag-in-container, wherein the preform consists of an assembly of an inner preform fitted into an outer preform such as to have a cavity transverse to the outer container's wall at a location very close to the preform assembly's mouth. Upon blow-moulding, said vent is maintained in the thus produced bag-in-container. It should be noted that the thickness of the preform's walls disclosed in JPA10180853 varies locally which can lead to serious processing and reproducibility problems of the final bag-in-container upon blow-moulding.

In order to optimize delamination of the inner and outer layers upon blowing pressurized gas into the vents, said vents should preferably run parallel to the interface between the two layers to provide a wedge effect. In the solutions proposed in the prior art relating to integrally blow-moulded bag-in-containers However, the vents run perpendicular to the interface and open to the atmosphere through a hole across, and normal to the outer container's wall, therefore providing no wedge effect and thus reducing the efficacy and reproducibility of the delamination of the inner bag from the outer container.

Bag-in-containers for beverage, like beer or sodas are usually positioned in a specially designed appliance comprising a dispensing passage to be connected to the mouth opening of the inner bag and a source of pressurized gas (generally air) to be connected to the vents opening(s). For reasons of compactness of the appliance, the vents design is restricted and should preferably open to the atmosphere at a location adjacent to the bag-in-container's mouth and oriented along the same axis as the latter, so as to allow all the piping to be bundled together. Such design follows the traditional beer keg interface in this regard, which is of course an advantage as it allows the replacement of a traditional keg by an integrally blow-moulded bag-in-container, without having to change the dispensing appliance.

It follows from the foregoing that there remains a need in the art for an integrally blow-moulded bag-in-container dispense package that allows optimization of the delamination of the inner bag from the outer container upon injection of a pressurized gas at the interface thereof and, at the same time, which can be used with the existing dispensing appliances.

SUMMARY OF THE INVENTION

The present invention is defined in the appended independent claims. Preferred embodiments are defined in the dependent claims. In particular the present invention relates to an integrally blow-moulded bag-in-container having an inner layer forming the bag and an outer layer forming the container, and a mouth fluidly connecting the volume defined by the bag to the atmosphere. The container further includes at least one interface vent fluidly connecting the interface between inner and outer layers to the atmosphere, wherein the at least one vent runs parallel to the interface between inner and outer layers and opens to the atmosphere at a location adjacent to, and oriented approximately coaxially with the bag-in-container's mouth.

The present invention also concerns a preform for blow-moulding the bag-in-container of the present invention. The preform includes an inner layer and an outer layer, and a body, a neck region, and a mouth fluidly connecting the space defined by the inner layer to the atmosphere, wherein the inner and outer layers are connected to one another by an interface at least at the level of the neck region. The preform includes at least one interface vent running parallel to the interface and opening to the atmosphere at a location adjacent to, and oriented coaxially with the preform's mouth.

The inner and outer layers of the preform (and consequently of the bag-in-container) of the present invention may consist of different or the same materials. The two layers of the preform may be connected by an interface throughout substantially the whole inner surface of the outer layer. Inversely, they may be separated over a substantial area of the preform's body by a gap containing air and which is in fluid communication with at least one interface vent. The preform may be an assembly of two separate inner and outer preforms or, alternatively, they may be an integral preform obtained by injection moulding one layer on top of the other.

The vent preferably is in the shape of a wedge with the broad side at the level of the opening thereof and getting thinner as it penetrates deeper into the vessel, until the two layers meet to form an interface. The container may comprise one or several vents evenly distributed around the lip of the bag-in-container's mouth.

One advantageous method to produce the bag-in-container of the present invention comprises the following steps:

providing a preform as described above, wherein a gap containing air separates the inner and outer layers over a substantial area of the preform's body and wherein said gap is in fluid communication with at least one interface vent;

bringing said preform to blow-moulding temperature;

fixing the thus heated preform at the level of the neck region with fixing means in the blow-moulding tool;

blow-moulding the thus heated preform to form a bag-in-container;

wherein, in a first stage, a gas is blown into the space defined by the inner layer to stretch the preform, whilst the air in the gap separating the preform inner and outer layers is prevented from being evacuated by closing said at least one preform interface vent with a valve located in said fixing means; and in a second stage, when the air pressure building up in said gap reaches a preset value, the valve opens thus allowing evacuation of the air enclosed in the gap.

A particularly preferred embodiment of the preform according to the present invention is an integral two layer preform which may be manufactured by a process comprising the following sequential steps:

injection moulding the preform's inner layer onto a core;

injection moulding the preform's outer layer onto the inner layer, extracting the thus formed preform from the core, wherein said core is provided at the base thereof with at least one pin suitable for forming an interface vent running parallel to the interface between said first and second layers and opening to the atmosphere at a location adjacent to, and oriented coaxially with the preform's mouth.

DETAILED DESCRIPTION OF THE INVENTION

Figure 1A:
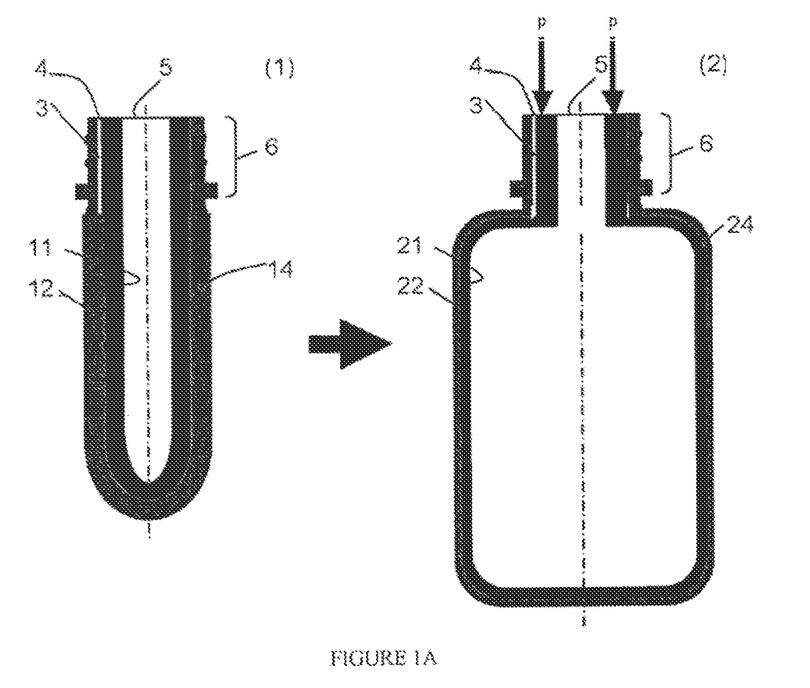
FIG. 1A is a schematic cross-sectional representation of a first embodiment of a preform according to the present invention and the bag-in-container obtained after blow-moulding thereof.
Figure 1B:
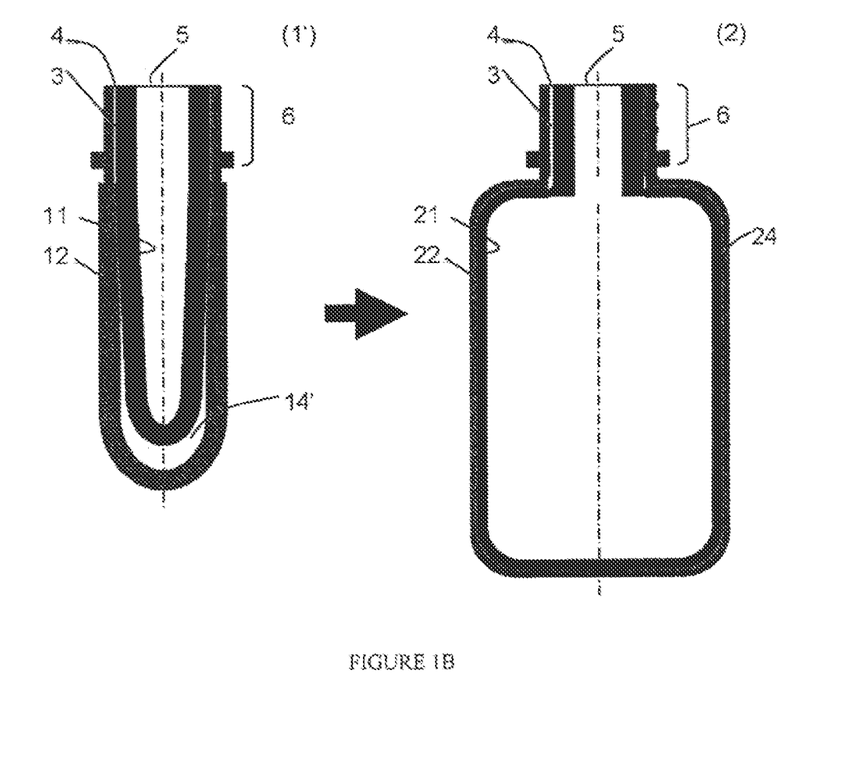
FIG. 1B is a schematic cross-sectional representation of a second embodiment of a preform according to the present invention and the bag-in-container obtained after blow-moulding thereof.

Referring now to appended FIGS. 1A and 1B, there is illustrated an integrally blow-moulded bag-in-container (2) and a preform (1)&(1') for its manufacturing. The preform (1) comprises an inner layer (11) and an outer layer (12) joined at least at the level of the neck region (6) by an interface (shown on the right hand side). The region between inner and outer layers (11) and (12) may either consist of an interface (14) wherein the two layers are substantially contacting each other, or comprise a gap (14') in fluid communication with at least one vent (3). Said vent (3) comprises an opening (4) located adjacent to, and oriented coaxially with said preform's mouth (5).

The preform may consists of an assembly of two independent preforms (11) and (12) produced independently from one another and thereafter assembled such that the inner preform (11) fits into the outer preform (12). This solution allows for greater freedom in the design of the neck and vents, as well as in the choice of materials constituting each preform component. Alternatively, it can be an integral preform obtained by injection moulding one layer on top of the other. The latter embodiment is advantageous over the assembled preform in that it comprises no assembly step and one production station only is required for the preform fabrication. On the other hand, the design of the vents in particular is restricted and the respective melting temperatures of the inner and outer layers must be carefully matched depending on which layer is injected first; the rule of thumb being that the layer being injected first generally requires a higher melting temperature.

The inner and outer layers of the preform (1) may consist of different materials or the same material. In case different materials are used, some requirements must be fulfilled depending on the process parameters in the injection moulding of the preform as well as in the blow-moulding of the bag-in-container. It is important of course that both materials may be processed in a rather similar process window and that they will not form too strong an interface which would not satisfactorily release upon injecting pressurized gas at the interface.

Alternatively and surprisingly, good results can be obtained also with preforms wherein both inner and outer layers consist of the same material. The same polymer is considered in contact on either side of the interface between the inner and outer layers in the following cases:

inner and outer layers consist of the same material (e.g., $PET_{inner}$-$PET_{outer}$, regardless of the specific grade of each PET); or     the inner and outer layers consist of a blend or copolymer having at least one polymer in common, provided said polymer in common is at the interface, whilst the differing polymer is substantially absent of the interface (e.g., (0.85 PET+0.15 PA6)$_{inner}$(0.8 PET+0.2 PE)$_{outer}$.

The presence in a layer of low amounts of additives is not regarded as rendering the material different, so far as they do not alter the interface substantially.

Preferred materials for the preform and bag-in-container of the present invention are polyesters like PET, PEN, PTT, PTN; polyamides like PA6, PA66, PA11, PA12; polyolefins like PE, PP; EVOH; biodegradable polymers like polyglycol acetate (PGAc), polylactic acid (PLA); and copolymers and blends thereof. In case different materials are used for the inner and outer layers, their optimal blow-moulding temperatures should not differ from one another by more than about 70° C. preferably 40° C., most preferably 10° C., and ideally should have the same blow-moulding temperature. The layer's temperatures may be determined by IR-measurement.

The two layers (11) and (12) of the preform may be connected by an interface (14) throughout substantially the whole inner surface of the outer layer (cf. (1) in FIG. 1A). Inversely, they may be separated over a substantial area of the preform's body by a gap (14') containing air and which is in fluid communication with at least one interface vent (3) (cf. (1') in FIG. 1B). The latter embodiment is easier to realize when using a preform assembly designed such that the inner preform is firmly fixed to the outer preform at the neck region (6) and a substantial gap (14') may thus be formed between inner and outer layers (1) and (12).

A release agent may be applied at the interface on either or both surfaces of the inner and outer layer, which are to form the interface of the bag-in-container. In the case the outer layer is injection moulded onto the inner layer, the release agent can be applied at the outer surface of the inner layer prior to moulding the outer layer. Any release agents available on the market and best adapted to the material used for the preform and resisting the blowing temperatures, like silicon- or PTFE-based release agents (e.g., Freekote) may be used. The release agent may be applied just prior to loading the preforms into the blowmoulding unit, or the preforms may be supplied pretreated.

The application of a release agent is particularly beneficial with respect to the design of the inner layer. Indeed, lowering the interferential adhesive strength facilitates delamination of the inner layer from the outer layer and hence reduces stress exerted on the inner layer upon delamination, as such the inner layer can be designed very thin and flexible without risking that the inner layer is damaged upon delamination. Clearly, the flexibility of the inner bag is a key parameter for the liquid dispensing and moreover costs savings can be achieved in terms on material savings when the inner layer can be designed very thin.

The at least one vent (3) preferably is in the shape of a wedge with the broad side at the level of the opening (4) thereof and getting thinner as it penetrates deeper into the vessel, until the two layers meet to form an interface (14) at least at the level of the neck region. The container may comprise one or several vents evenly distributed around the lip of the bag-in-container's mouth. Several vents are advantageous as they permit the interface of the inner and outer layers (21) and (22) of the bag-in-container (2) to release more evenly upon blowing pressurized gas through said vents. Preferably, the preform comprises two vents opening at the vessel's mouth lip at diametrically opposed positions. More preferably, three, and most preferably, at least four vents open at regular intervals of the mouth lip.

The wedge shape of the vent is advantageous for the release of the interface but also for the production of an integral preform. A method for producing an integral preform suitable for blow-moulding a bag-in-container according to the present invention comprises the steps of:

injection moulding the preform's inner layer onto a core;
injection moulding the preform's outer layer onto the inner layer;
extracting the thus formed preform from the core, wherein said core is provided at the base thereof with at least one pin suitable for forming an interface vent running parallel to the interface between said first and second layers and opening to the atmosphere at a location adjacent to, and oriented coaxially with the preform's mouth. The core may comprise a single pin, but it preferably comprises more than one pin in order to have several vents opening around the lip of the container's mouth. The pins preferably have the shape of a wedge as, on the one hand, a wedge shaped vent has the advantages discussed above and, on the other hand, it allows for easier extraction of the thus produced integral preform from the mouldcore. The dimensions of the pins depend on the size of the bag-in-container and, in particular, of the mouth and lip thereof. For a typical home beverage dispenser of a capacity of about 56 liters, the pins have a length of about 5 to 75 mm, preferably 5 to 50 mm, most preferably 10 to 20 mm and their base, forming the vents openings, preferably are in the shape of an are section of length comprised between 3 and 15 mm, preferably 5 and 10 mm and of width comprised between 0.5 and 5 mm, preferably 0.5 and 2 mm.

The bag-in-container (2) of the present invention can be obtained by providing a preform as described above; bringing said preform to blow-moulding temperature; fixing the thus heated preform at the level of the neck region with fixing means in the blow-moulding tool; and blow-moulding the thus heated preform to form a bag-in-container. The inner and outer layers (21) and (22) of the thus obtained bag-in-container arm connected to one another by an interface (24) over substantially the whole of the inner surface of the outer layer. Said interface (24) is in fluid communication with the atmosphere through the vents (3), which maintained their original geometry through the blow-moulding process since the neck region of the preform where the vents are located is held firm by the fixing means and is not stretched substantially during blowing.

It is essential that the interface (24) between inner and outer layers (21) and (22) releases upon blowing pressurized gas through the vents in a consistent and reproducible manner. The success of said operation depends on a number of parameters, in particular, on the interfacial adhesive strength, the number, geometry, and distribution of the vents, and on the pressure of the gas injected. The interfacial strength is of course a key issue and can be modulated by the choice of materials for the inner and outer layers, and by the process parameters during blow-moulding. The pressure-time-temperature window used is of course of prime importance, but it has surprisingly been discovered that excellent results can be obtained if the blow-moulding process is carried out on a preform as described above, of the type wherein a gap containing air separates the inner and outer layers over a substantial area of the preform's body and wherein said gap is in fluid communication with at least one interface vent and wherein, in a first stage, a gas is blown into the space defined by the inner layer to stretch the preform, whilst the air in the gap separating the preform inner and outer layers is prevented from being evacuated by closing said at least one preform interface vent with a valve located in the fixing means; and in a second stage, when the air pressure building up in said gap reaches a preset value, the valve opens thus allowing evacuation of the air enclosed in the gap.

By this method, the inner layer is prevented from entering into contact with the outer layer by the air cushion enclosed within the gap separating the two layers when their respective temperatures are the highest. As stretching proceeds, the gap becomes thinner and air pressure within the gap increases. When the pressure reaches a preset value, the valve closing the vent opening releases, the air is ejected, and the inner layer is permitted to contact the outer layer and form an interface therewith at a stage where their respective temperatures have dropped to a level where adhesion between the layers cannot build up to any substantial level.

Alternatively or additionally, it is preferred to apply a (mechanical) pressure on the neck region of the inner layer in a direction as indicated by the arrows P in FIG. 1A after or during blow moulding. It has surprisingly been found that the application of such pressure facilitates release of the interface during the blow-moulding operation, hence further release upon blowing pressurized gas through the vents. Indeed, the application of such pressure on the neck portion of the inner layer allows to induce an spacing between the inner and outer layers at the shoulder portion of the beg-in-container, which spacing facilitates further delamination of the inner and outer layers upon blowing pressurized gas through the above mentioned vents.

A preform according to the present invention was produced by injecting a melt into a first mould cavity cooled at a temperature of T_mould ° C., to form the preform's inner layer (11). A melt was injected into a second mould cavity cooled to form the preform's outer layer (12). The two preform components were assembled to form a preform according to the present invention.

The preform produced as explained above was heated in an oven comprising an array of IRlamps and then fixed into a blow-moulding mould which walls were maintained at a desired temperature. Air was blown into the preform under pressure. The thus produced bag-in-container was then filled with a liquid and connected to an appliance for dispensing beverage comprising a source of compressed air in order to determine the delamination pressure.

The delamination pressure was determined as follows. The interface vents of said bag-in-container were connected to the source of compressed air. Air was injected through the vents at a constant pressure, and the interface between inner and outer layers was observed. The pressure was increased stepwise until delamination pressure was reached. Delamination pressure is defined as the pressure at which the inner bag separates from the outer layer over the whole of their interface and collapses. The surfaces of the thus separated layers were examined for traces of bonding.

The delamination pressure of the bag-in-container described above was of about 05±0.1 bar overpressure and showed little trace of cohesive fracture between the inner and outer layers. This example demonstrates that bag-in-containers of excellent quality can be produced with integral preforms according to the present invention.

What is claimed is:

1. A method for producing a bag-in-container having an inner layer forming the bag and an outer layer forming the container, and a mouth fluidly connecting the volume defined by the bag to the atmosphere, said container having at least one interface vent fluidly connecting the interface between inner and outer layers to the atmosphere, said at least one vent runs parallel to the interface between inner and outer layers and opens to the atmosphere at a location adjacent to, and oriented approximately coaxially with said bag-in-container's mouth, comprising the following steps:

provide a preform, the preform consists of an assembly of two separate inner and outer preforms fitted into one another, the inner preform comprises a mouth and fitted in the outer preform, wherein said preform comprises at least one interface vent fluidly connecting an interface between inner and outer preforms to the atmosphere, said at least one vent running parallel to the interface between inner and outer preforms and opening to the atmosphere at a location adjacent to, and oriented approximately coaxially with, said inner preform's mouth, and wherein the inner preform is made of a different material from the outer preform;

bringing said preform to blow-moulding temperature;

fixing the heated preform at the level of the neck region with fixing means in the blow-moulding tool; and blow-moulding the heated preform to form a bag-in-container.

2. The method according to claim 1, wherein the inner and outer layers of the preform are separated over a substantial area of the preform's body by a gap containing air and which is in fluid communication with at least one interface vent, and wherein the blow-moulding operation further comprises the following two stages:

feeding a gas in a first stage into the space defined by the inner layer to stretch the preform, whilst the air in the gap separating the preform inner and outer layers is prevented from being evacuated by closing said at least one preform interface vent with a valve located in said fixing means; and opening said valve in a second stage, when the air pressure building up in said gap reaches a preset value, thus allowing evacuation of the air enclosed in the gap.

3. The method according to claim 1, wherein the inner and outer layers of the preform consist of a material selected from PET, PEN, PTT, PA, PP, PE, HDPE, EVOH, PGAc, PLA, and copolymers or blends thereof.

4. The method according to claim 1, wherein at least one vent is in the shape of a wedge with the broad side at the level of the opening thereof and getting thinner as it penetrates deeper into the vessel, until the inner and outer layers meet to form an interface.

5. The method according to claim 4, wherein more than one vent is distributed around the lip of the preform's mouth.

* * * * *